United States Patent [19]

Otaegui-Ugarte

[11] 3,941,404

[45] Mar. 2, 1976

[54] PROTECTOR FOR VEHICLE OCCUPANT

[76] Inventor: José Maria Otaegui-Ugarte, Barrio de Alcibar, Oyarzun, Guipuzcoa, Spain

[22] Filed: Feb. 25, 1975

[21] Appl. No.: 553,040

[52] U.S. Cl............ 280/150 AB; 2/92; 244/122 B; 280/150 B; 280/150 SB; 297/390; 297/389
[51] Int. Cl.².......................................... B60R 21/08
[58] Field of Search.... 280/150 AB, 150 B, 150 SB; 2/92, DIG. 3; 297/390, 389, 384; 244/122 B, 122 AG

[56] References Cited
UNITED STATES PATENTS

| | | | |
|---|---|---|---|
| 1,547,097 | 7/1925 | Curle | 2/92 |
| 2,806,737 | 9/1957 | Maxwell | 280/150 AB X |
| 2,833,554 | 5/1958 | Ricordi | 297/390 X |
| 3,243,822 | 4/1966 | Lipkin | 280/150 AB X |
| 3,262,716 | 7/1966 | Graham | 280/150 B |
| 3,278,230 | 10/1966 | Boyce | 297/384 |
| 3,524,679 | 8/1970 | DeLavenne | 280/150 BX |
| 3,529,864 | 9/1970 | Rose | 297/389 X |
| 3,552,770 | 1/1971 | Berryman | 280/150 AB |
| 3,827,716 | 8/1974 | Vaughn | 280/150 AB |
| 3,829,122 | 8/1974 | Bastide | 280/150 B |

FOREIGN PATENTS OR APPLICATIONS

| | | | |
|---|---|---|---|
| 1,944,821 | 3/1971 | Germany | 280/150 AB |
| 1,338,252 | 8/1963 | France | 297/390 |
| 239,078 | 3/1965 | Austria | 297/389 |

Primary Examiner—Philip Goodman
Assistant Examiner—John P. Silverstrim
Attorney, Agent, or Firm—Imirie, Smiley & Linn

[57] ABSTRACT

A protective breastplate rigidly attached to the straps of a vehicle seat belt in which fiber reinforced material layers are shaped to form an air-tight, hollow chamber anatomically adapted to the upper thorax and abdomen of a vehicle occupant; a metal mesh lining is provided on the interior of the chamber to prevent pointed objects from piercing the protector, and an air intake valve is attached at the bottom.

3 Claims, 2 Drawing Figures

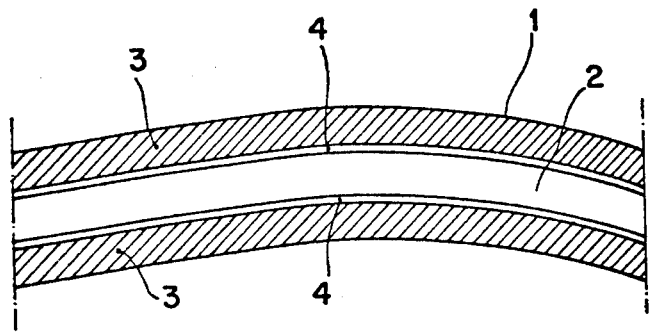
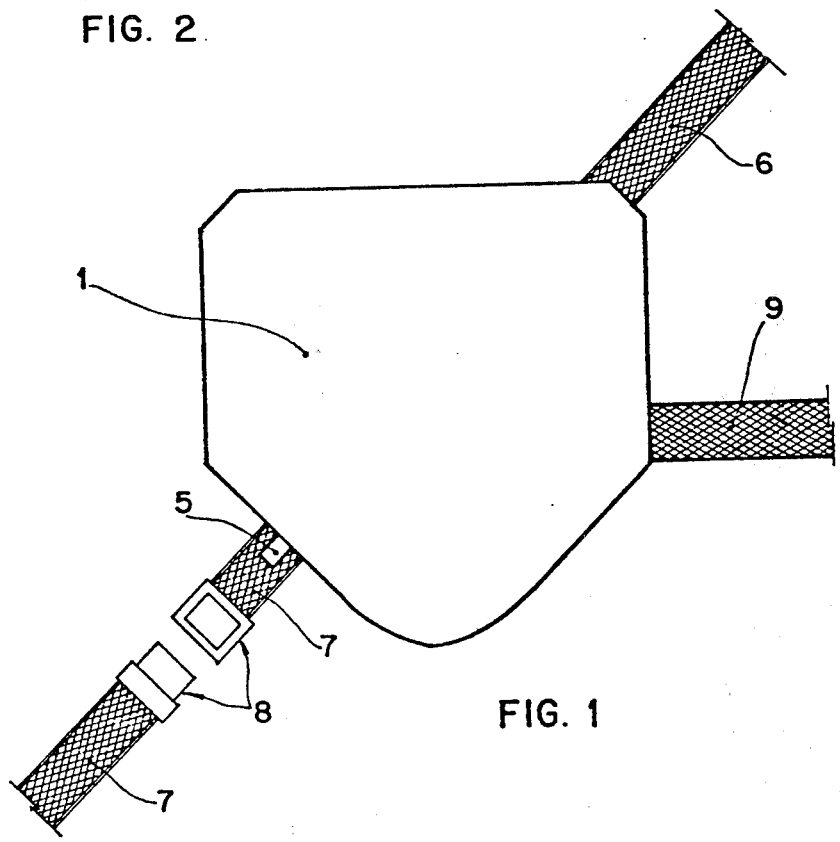

PROTECTOR FOR VEHICLE OCCUPANT

BACKGROUND OF THE INVENTION

The present invention relates to chest protectors especially designed to protect the driver and passengers of a vehicle, with the object of palliating, as much as possible, the blows received in case of an accident, due to the steering wheel or contusive objects of the automobile.

At the present time, as a safety measure particularly for the driver and the passenger in the front seat, the use of safety belts has been promoted and even made obligatory for vehicles of various types. Such safety belts, in most cases, have proven their effectiveness in keeping the users from being thrown out of the seat and injured. Despite this important success, such belts have certain drawbacks since they do not avoid injury by impact of the steering wheel or even the edge of the dashboard when the accident moves them toward the seats, reaching the persons sitting there, with serious consequences.

SUMMARY OF THE INVENTION

To avoid these drawbacks as much as possible and to palliate their consequences, the object of the present application has been developed, which consists of a chest protector, in the form of a breastplate, connected to safety belts, which has an interior chamber that can be filled with air thus forming a protecting pneumatic breastplate, able to dampen the blows or impacts from the front, naturally, within certain limits, which would otherwise have fatal consequences or at least be very serious.

A particularly important characteristic resides in the fact that the plate surrounding the pneumatic chamber has incorporated in all its surface a metallic mesh, provided for the double purpose of giving the breastplate greater resistance, keeping the pneumatic sack from bursting from the air pressure, and to prevent any contusive or piercing object from reaching the body.

There will be given below a complete description of a preferred embodiment with reference to the accompanying drawings.

BRIEF DESCRIPTION OF THE DRAWINGS

FIG. 1 is a front view of a preferred embodiment of a breastplate according to the present invention.

FIG. 2 is a partial cross-sectional view of the breastplate of FIG. 1.

DESCRIPTION OF THE PREFERRED EMBODIMENT

As represented in FIG. 1 the present invention consists of a substantially flat, hollow air chamber 1 shaped like a breast-plate and anatomically adapted to conform to the thorax and abdomen of a vehicle occupant. The pad 1 forms an air compartment 2 (FIG. 2) surrounded and shaped by fiber layers 3 made solid at their edges by fusion or other fluid tight means; fiber layers 3 include an interior lining 4, made up of a metallic mesh which gives great resistance and protection to the unit. In a lower part is provided an air intake valve 5 located in superposition with the seat belt so as not to bother or interfere with the user.

The chest pad or protector thus constituted is made solid with the straps of the safety belt of a vehicle so that they form a single body. Such belt comprises an upper strap 6 which runs diagonally and fastens to the body of the automobile. Chamber 1 is attached as an integral, central portion of the diagonal belt, of which a lower part 7 has a buckle 8 interposed; laterally attached to the chamber is a third strap 9 for fastening to the body or floor of the car.

Both the fastening hardware and the buckle are of the standard type, and their arrangement on the chest pad 1 is adapted to the position of the user, i.e., the location of straps 6, 7, and 9 are adapted to the left or right depending on the seat on which they are to be installed.

In this way, once the driver or rider has been seated, the safety belts are buckled in the usual way, whereby the chest protector 1 covers the thorax and abdomen, acting as a pneumatic protective shield, once the air has been inflated inside through valve 5.

Air intake valve 5 is placed on the front 1 so that it is located above the lower safety belt strap 7, so that it will not extend into or injure the user.

Finally, it should be pointed out that the chest protector thus described may be made in various sizes to be adapted in each case to the size of the user and the model of the vehicles.

The shape, dimensions and materials may vary provided that the essence of the object described is not altered, changed or modified.

The terms in which this description is written are intended to be taken in a broad exemplary character and not in a limiting sense.

What is claimed is:

1. A chest protector for a vehicle occupant comprising a substantially flat, hollow air chamber shaped to conform to the thorax and abdomen of the occupant, said chamber having a metal mesh interior lining and a fiber-reinforced exterior covering; an air valve on said chamber establishing selective communication with the interior of the chamber for supplying pressurized air thereto; and seat belts to which said air chamber is rigidly secured for protective disposition against the lower chest and abdomen when the belts are buckled about the occupant.

2. The invention according to claim 1 wherein said seat belts include a diagonal shoulder belt having said air chamber as an integral, central portion thereof and having a buckle interposed in the diagonal belt portion below said chamber; and wherein said seat belts further include a lateral belt extending from a side of said air chamber for attachment to the body and floor of the vehicle.

3. The invention according to claim 2, wherein said air valve is disposed in superposition with said diagonal belt portion below said chamber so as to be shielded from the occupant.

* * * * *